(12) United States Patent
Mikami

(10) Patent No.: US 10,933,735 B2
(45) Date of Patent: Mar. 2, 2021

(54) VEHICLE

(71) Applicant: HONDA MOTOR CO., LTD., Tokyo (JP)

(72) Inventor: Shinji Mikami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 45 days.

(21) Appl. No.: 16/498,958

(22) PCT Filed: Mar. 30, 2018

(86) PCT No.: PCT/JP2018/013700
§ 371 (c)(1),
(2) Date: Sep. 27, 2019

(87) PCT Pub. No.: WO2018/181929
PCT Pub. Date: Oct. 4, 2018

(65) Prior Publication Data
US 2020/0317059 A1 Oct. 8, 2020

(30) Foreign Application Priority Data

Mar. 31, 2017 (JP) .............................. JP2017-070275

(51) Int. Cl.
*B60K 1/00* (2006.01)
*B60K 6/442* (2007.10)
(Continued)

(52) U.S. Cl.
CPC ............... *B60K 6/442* (2013.01); *B60K 6/24* (2013.01); *B60K 6/26* (2013.01); *B60L 1/00* (2013.01);
(Continued)

(58) Field of Classification Search
CPC .. B60K 6/442; B60K 6/24; B60K 6/26; B60L 1/00; B60L 3/0061; B60L 3/00
See application file for complete search history.

(56) References Cited

U.S. PATENT DOCUMENTS 7,180,205 B2 * 2/2007 Wirdel .................... F02N 11/14
307/10.1
7,443,048 B2 * 10/2008 Bernardi ................... B60L 1/12
307/9.1
(Continued)

FOREIGN PATENT DOCUMENTS

DE  10 2013 008 770 B3  10/2014
JP      2009-247152 A    10/2009
(Continued)

OTHER PUBLICATIONS

Office Action dated Sep. 29, 2020 issued over the corresponding Japanese Patent Application No. 2019-510270 with the English translation thereof.
(Continued)

*Primary Examiner* — John D Walters
*Assistant Examiner* — James J Triggs
(74) *Attorney, Agent, or Firm* — Carrier Blackman & Associates, P.C.; Joseph P. Carrier; William D. Blackman

(57) ABSTRACT

Provided is a vehicle capable of suppressing the inflow of an overcurrent from a rotating electrical machine to a battery side as a result of a reverse voltage generated when the rotating electrical machine is operated as an electric power generator. A control device controls a switch disposed between a battery and an inverter to an OFF state if an abnormality is detected in a motor or the inverter. At this time, the control device controls a switch disposed between the battery on the one hand and auxiliary equipment and a motor on the other hand to an ON state, causing the vehicle to continue to run using the motor or an engine.

12 Claims, 9 Drawing Sheets

(51) Int. Cl.
    *B60L 50/60*     (2019.01)
    *B60K 6/24*      (2007.10)
    *B60K 6/26*      (2007.10)
    *B60L 1/00*      (2006.01)
    *B60L 3/00*      (2019.01)
    *B60L 3/04*      (2006.01)
    *B60K 6/52*      (2007.10)

(52) U.S. Cl.
    CPC ............... *B60L 3/0061* (2013.01); *B60L 3/04* (2013.01); *B60L 50/60* (2019.02); *B60K 6/52* (2013.01); *B60Y 2200/92* (2013.01)

(56) References Cited

U.S. PATENT DOCUMENTS

| | | | | |
|---|---|---|---|---|
| 8,587,243 B2* | 11/2013 | Sakane | .................... | B60L 15/16 318/473 |
| 8,760,095 B2* | 6/2014 | Iwaji | ....................... | H02P 29/02 318/400.26 |
| 9,515,560 B1* | 12/2016 | Telefus | ................. | H03F 3/2176 |
| 10,509,079 B2* | 12/2019 | Niimura | ................ | H02M 7/487 |
| 2010/0036555 A1* | 2/2010 | Hosoda | ...................... | B60L 3/04 701/22 |
| 2015/0034406 A1 | 2/2015 | Hirose | | |

FOREIGN PATENT DOCUMENTS

| | | |
|---|---|---|
| JP | 2010-207054 A | 9/2010 |
| JP | 4757815 B2 | 8/2011 |
| WO | 2013/125010 A1 | 8/2013 |

OTHER PUBLICATIONS

PCT/ISA/210 from International Application PCT/JP2018/013700 with the English translation.

\* cited by examiner

VEHICLE

TECHNICAL FIELD

The present invention relates to a vehicle that uses a rotary electric machine as a motor and a power generator for vehicle driving.

BACKGROUND ART

A hybrid vehicle, an electric vehicle, or the like includes a rotary electric machine including an armature with plural phases. The rotary electric machine is used as a motor for vehicle driving by receiving electric power from a battery (cell) and is also used as a power generator that supplies electric power to the battery or an auxiliary machine. An inverter (driving circuit) is disposed in a power path between the battery and the rotary electric machine, and the rotary electric machine is controlled by control of the inverter.

If failure has occurred in any one of the inverter and the rotary electric machine, a permanent magnet type rotary electric machine may stop its active operation. However, even in this case, the permanent magnet type rotary electric machine passively operates as the power generator by receiving rotation force from the outside so as to generate counter electromotive voltage. If overcurrent has flowed into the battery side from the rotary electric machine side due to the counter electromotive voltage that is generated as described above, overcharge may occur in the battery. Electric power that is flowed into the battery directly changes into work of an end of the machine. That is to say, sudden deceleration torque may occur in the rotary electric machine.

German Patent No. 102013008770 discloses a motive power transmission device that connects and disconnects a motive power transmission path, which is mechanical, between a rotary electric machine and wheels. In a vehicle including the motive power transmission device as above, if failure has occurred in any one of an inverter and the rotary electric machine, the motive power transmission device disconnects the motive power transmission path, so that the rotary electric machine can be stopped. Thus, it is possible to prevent overcurrent from flowing into a battery side from the rotary electric machine side.

SUMMARY OF INVENTION

However, a vehicle in which the rotary electric machine and the wheels are directly connected with each other does not include the motive power transmission device that connects and disconnects the motive power transmission path between the rotary electric machine and the wheels. Thus, the motive power transmission path cannot be disconnected. Therefore, if the failure has occurred in the inverter or the rotary electric machine, the overcurrent still flows into the battery side from the rotary electric machine side due to the counter electromotive voltage generated when the permanent magnet type rotary electric machine operates as the power generator.

The present invention has been made in view of the above problem, and an object is to provide a vehicle in which the flow of overcurrent from a rotary electric machine side to a battery side due to counter electromotive voltage generated when the rotary electric machine operates as a power generator can be suppressed.

A vehicle according to the present invention includes: a rotary electric machine for vehicle driving; a battery configured to supply electric power to the rotary electric machine; an auxiliary machine configured to operate with lower voltage than voltage of the battery; a power path including a first power path connected to the rotary electric machine, a second power path connected to the auxiliary machine, a third power path connected to the battery, and a branch part that branches to a side of the first power path, a side of the second power path, and a side of the third power path; a first switch disposed in the first power path between the branch part and the rotary electric machine; a second switch disposed in the second power path between the branch part and the auxiliary machine or disposed in the third power path between the branch part and the battery; a control device configured to control operation of the first switch and the second switch; a driving circuit disposed in the first power path in order to drive the rotary electric machine; a driving source other than the rotary electric machine, the driving source configured to be used for the vehicle driving; and a sensor configured to detect abnormality in the rotary electric machine or the driving circuit, wherein if the sensor has detected the abnormality, the control device controls in a manner that the first switch is turned off and the second switch is turned on, and continues traveling of the vehicle by using the driving source.

In the above configuration, when the abnormality has occurred in the rotary electric machine for the vehicle driving or the driving circuit, the first switch is controlled so as to be turned off. Thus, it is possible to prevent overcurrent from flowing into the battery from the rotary electric machine due to counter electromotive voltage generated when the rotary electric machine operates as a power generator. In addition, since the second switch is controlled so as to be turned on at this time, electric power can be supplied from the battery to the auxiliary machine. Thus, operation of the auxiliary machine can be continued.

In the vehicle according to the present invention, the driving source may include another rotary electric machine that is different from the rotary electric machine, the power path may include a fourth power path connected to the other rotary electric machine, the other rotary electric machine may be disposed in the fourth power path that branches from the branch part, and if the abnormality has occurred in the rotary electric machine or the driving circuit, electric power may be supplied from the battery to the other rotary electric machine through the second power path and the fourth power path in a manner that the traveling is continued by the other rotary electric machine.

In the above configuration, in a case where control is performed so that the first switch is turned off and the second switch is turned on, even if failure occurs in the different rotary electric machine or the driving circuit that drives the different rotary electric machine, the battery can be protected by controlling to turn off the second switch.

In the vehicle according to the present invention, the first switch may be disposed in the power path between the rotary electric machine and the driving circuit.

In the above configuration, the rotary electric machine and the driving circuit can be electrically disconnected from each other by turning off the first switch. Thus, in a case where the vehicle continues traveling in the occurrence of short-circuit failure in the rotary electric machine or the driving circuit, the restriction on the rotation speed of the rotary electric machine or driving can be suppressed.

A vehicle according to the present invention includes: a first rotary electric machine and a second rotary electric machine for vehicle driving; a battery configured to supply electric power to the first rotary electric machine and the second rotary electric machine; a power path including a first power path connected to the first rotary electric machine, a second power path connected to the second rotary electric machine, a third power path connected to the battery, and a branch part that branches to a side of the first power path, a side of the second power path, and a side of the third power path; a first switch disposed in the first power path between the branch part and the first rotary electric machine; a second switch disposed in the second power path between the branch part and the second rotary electric machine or disposed in the third power path between the branch part and the battery; a control device configured to control operation of the first switch and the second switch; a driving circuit disposed in the first power path in order to drive the first rotary electric machine; and a sensor configured to detect abnormality in the first rotary electric machine or the driving circuit, wherein if the sensor has detected the abnormality, the control device controls in a manner that the first switch is turned off and the second switch is turned on.

In the above configuration, when the abnormality has occurred in the first rotary electric machine for the vehicle driving or the driving circuit, the first switch is controlled so as to be turned off. Thus, it is possible to prevent the overcurrent from flowing into the battery from the rotary electric machine due to the counter electromotive voltage generated when the rotary electric machine operates as the power generator. In addition, since the second switch is controlled so as to be turned on at this time, electric power can be supplied from the battery to the second rotary electric machine. Thus, the traveling can be continued by using the second rotary electric machine as the driving source.

In the vehicle according to the present invention, the second switch may be disposed in the second power path.

A vehicle according to the present invention includes: a first rotary electric machine and a second rotary electric machine for vehicle driving; a battery configured to supply electric power to the first rotary electric machine and the second rotary electric machine; a power path including a first power path connected to the first rotary electric machine, a second power path connected to the second rotary electric machine, a third power path connected to the battery, and a branch part that branches to a side of the first power path, a side of the second power path, and a side of the third power path; a first switch disposed in the first power path between the branch part and the first rotary electric machine or disposed in the third power path between the branch part and the battery; a second switch disposed in the second power path between the branch part and the second rotary electric machine; a control device configured to control operation of the first switch and the second switch; a driving circuit disposed in the second power path in order to drive the second rotary electric machine; and a sensor configured to detect abnormality in the second rotary electric machine or the driving circuit, wherein if the sensor has detected the abnormality, the control device controls in a manner that the second switch is turned off and the first switch is turned on.

In the above configuration, when the abnormality has occurred in the second rotary electric machine for the vehicle driving or the driving circuit, the second switch is controlled so as to be turned off. Thus, it is possible to prevent the overcurrent from flowing into the battery from the rotary electric machine due to the counter electromotive voltage generated when the rotary electric machine operates as the power generator. In addition, since the first switch is controlled so as to be turned on at this time, electric power can be supplied from the battery to the first rotary electric machine. Thus, the traveling can be continued by using the first rotary electric machine as the driving source.

In the vehicle according to the present invention, the first switch may be disposed in the first power path.

The vehicle according to the present invention may further include an auxiliary machine connected to the battery through branch paths that branch from the power path between the battery and the first switch, the auxiliary machine being configured to operate with lower voltage than voltage of the battery.

In the above configuration, even after the first switch is controlled so as to be turned off, electric power can be supplied from the battery to the auxiliary machine. Thus, the operation of the auxiliary machine can be continued.

The vehicle according to the present invention may further include an auxiliary machine connected to the battery through branch paths that branch from the power path between the battery and the second switch, the auxiliary machine being configured to operate with lower voltage than voltage of the battery.

In the above configuration, even after the second switch is controlled so as to be turned off, electric power can be supplied from the battery to the auxiliary machine. Thus, the operation of the auxiliary machine can be continued.

The vehicle according to the present invention may further include: an internal combustion engine connected to the first rotary electric machine in a manner that motive power is configured to be transmitted between the internal combustion engine and the first rotary electric machine; and an auxiliary machine connected to the battery and the first rotary electric machine through the power path that branches from the power path between the first switch and the first rotary electric machine, the auxiliary machine being configured to operate with lower voltage than voltage of the battery, and configured to operate with electric power supplied from the battery or electric power supplied from the first rotary electric machine that generates electric power by the motive power from the internal combustion engine.

In the above configuration, even after the first switch is controlled so as to be turned off, electric power can be supplied from the first rotary electric machine driven by the internal combustion engine to the auxiliary machine. Thus, the operation of the auxiliary machine can be continued.

The vehicle according to the present invention may further include: an internal combustion engine connected to the second rotary electric machine in a manner that motive power is configured to be transmitted between the internal combustion engine and the second rotary electric machine; and an auxiliary machine connected to the battery and the second rotary electric machine through the power path that branches from the power path between the second switch and the second rotary electric machine, the auxiliary machine being configured to operate with lower voltage than voltage of the battery, and configured to operate with electric power supplied from the battery or electric power supplied from the second rotary electric machine that generates electric power by the motive power from the internal combustion engine.

In the above configuration, even after the second switch is controlled so as to be turned off, electric power can be supplied from the second rotary electric machine driven by the internal combustion engine to the auxiliary machine. Thus, the operation of the auxiliary machine can be continued.

The vehicle according to the present invention may further include piezoelectric elements disposed in branch paths that branch from between the first switch and the driving circuit and configured to generate pressure by being supplied with electric power, wherein: as pressing force becomes larger, contact resistance between a terminal of the driving circuit and a terminal of the rotary electric machine may become lower, and as the pressing force becomes smaller, the contact resistance may become higher; and when the first switch is ON, the voltage may be applied from the battery to the piezoelectric elements in a manner that the pressing force between the terminal of the driving circuit and the terminal of the rotary electric machine becomes large, and when the first switch is OFF, the voltage applied from the battery to the piezoelectric elements may be stopped and the pressing force between the terminal of the driving circuit and the terminal of the rotary electric machine becomes small.

In the above configuration, by turning off the first switch, the contact resistance between the terminal of the driving circuit and the terminal of the rotary electric machine can be high. If the abnormality occurs in the driving circuit or the rotary electric machine, the overcurrent circulates between the driving circuit and the rotary electric machine. At this time, a part where the contact resistance is high generates heat and the part is melted and broken. As a result, the driving circuit and the rotary electric machine are electrically disconnected from each other. Thus, it is possible to prevent the rotary electric machine from operating as a brake.

According to the present invention, the flow of the overcurrent from the rotary electric machine to the battery due to the counter electromotive voltage generated when the rotary electric machine operates as the power generator can be prevented. In addition, since it is possible to supply electric power from the battery to the auxiliary machine or the different rotary electric machine, the operation of the auxiliary machine or the different rotary electric machine can be continued.

DESCRIPTION OF EMBODIMENTS

Preferred embodiments of a vehicle according to the present invention are hereinafter described in detail with reference to the attached drawings. Note that in the description below, it is assumed that a vehicle 10 is a hybrid vehicle that includes an engine 18 and motors 14, 20. However, the present invention can also be applied to a plug-in hybrid vehicle and an electric vehicle that does not include the engine 18.

1. First Embodiment 1.1. Structure of Vehicle 10

Figure 1:
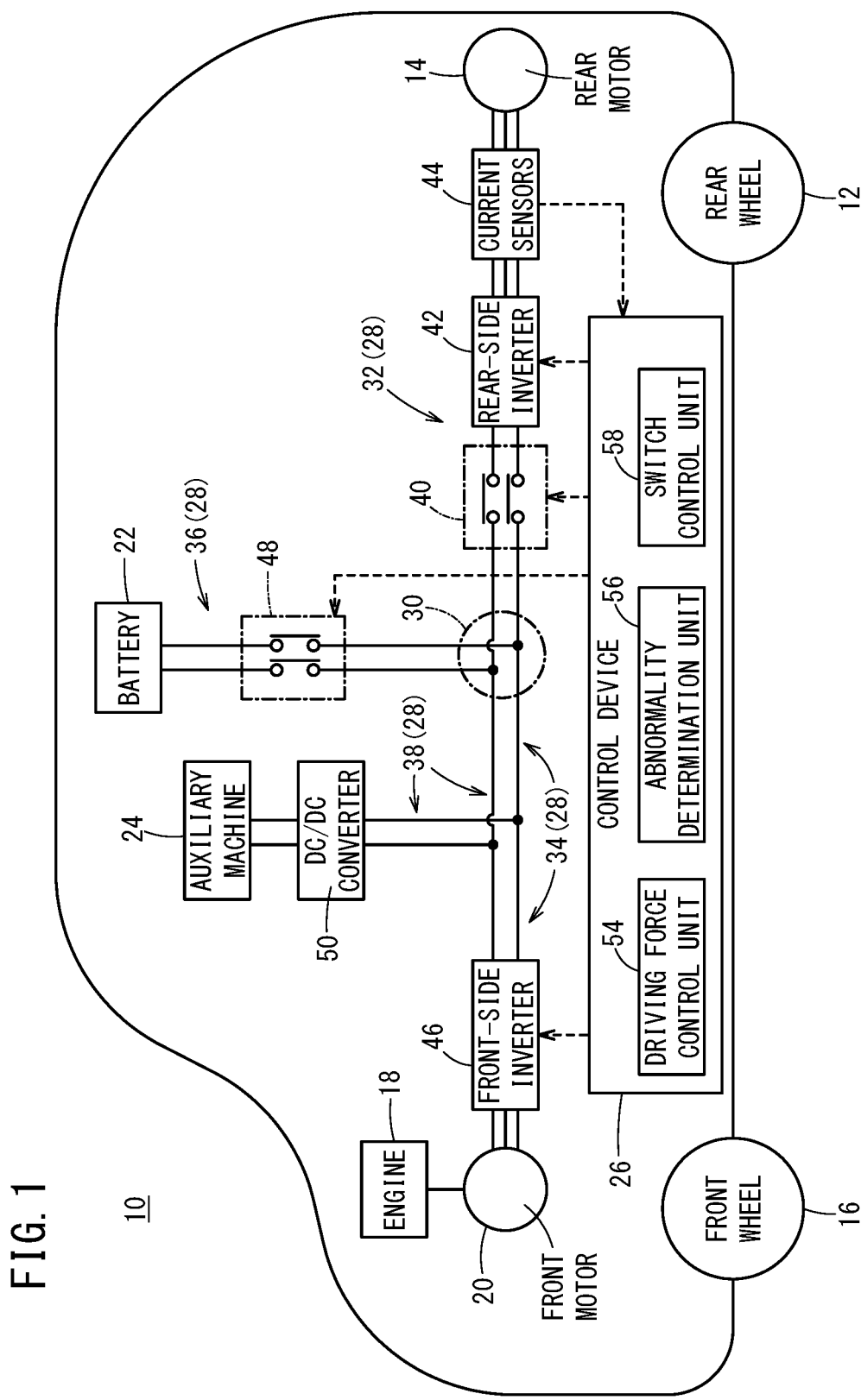
FIG. 1 is a circuit diagram that simply illustrates a circuit of a vehicle according to a first embodiment of the present invention.

As illustrated in FIG. 1, the vehicle 10 uses the electric motors 14, 20 as rotary electric machines. The vehicle 10 includes the motor 14 (hereinafter, also referred to as a rear motor 14), the engine 18, the motor 20 (hereinafter, also referred to as a front motor 20), a battery 22 with high voltage, an auxiliary machine 24 (for example, an air conditioner), and a control device 26. The motor 14 drives rear wheels 12. The engine 18 and the motor 20 drive front wheels 16. The battery 22 supplies electric power to the motors 14, 20. The auxiliary machine operates with lower voltage than the voltage of the battery 22. The control device 26 controls the driving force of the vehicle 10. As described above, the engine 18 may be omitted.

The motors 14, 20, the battery 22, and the auxiliary machine 24 are electrically connected with each other through a power path 28. The power path 28 includes a branch part 30 that branches to a side of the rear motor 14, a side of the battery 22, and a side of the front motor 20 and the auxiliary machine 24. The power path 28 mainly includes a rear-side power path 32 (hereinafter, also referred to as a power path 32) between the branch part 30 and the rear motor 14, a front-side power path 34 (hereinafter, also referred to as a power path 34) between the branch part 30 and the front motor 20, a battery-side power path 36 (hereinafter, also referred to as a power path 36) between the branch part 30 and the battery 22, and an auxiliary machine-side power path 38 (hereinafter, also referred to as a power path 38) between the branch part 30 and the auxiliary machine 24. The front-side power path 34 and the auxiliary machine-side power path 38 have a common part partially.

On the rear-side power path 32, from the branch part 30, a rear-side switch 40 (hereinafter, also referred to as a switch 40), a rear-side inverter 42 (hereinafter, also referred to as an inverter 42), current sensors 44, and the rear motor 14 are arranged in this order. On the front-side power path 34, from the branch part 30, a front-side inverter 46 (hereinafter, also referred to as an inverter 46) and the front motor 20 are arranged in this order. On the battery-side power path 36, from the branch part 30, a battery-side switch 48 (hereinafter, also referred to as a switch 48) and the battery 22 are arranged in this order. On the auxiliary machine-side power path 38, from the branch part 30, a DC/DC converter 50 and the auxiliary machine 24 are arranged in this order.

The motors 14, 20 are permanent magnet type rotary electric machines in which a rotor or a stator includes a permanent magnet. For example, the motors 14, 20 are three-phase AC brushless type motors. However, the motors 14, 20 may be other motors such as a three-phase AC brush type, a single-phase AC type, and a DC type. The rear motor 14 may be either the same as or different from the front motor 20 in the specification. The rear wheels 12 are directly connected to an output shaft of the rear motor 14, and a rotation shaft of the front wheels 16 is directly connected to an output shaft of the front motor 20. An output shaft of the engine 18 is also connected to the output shaft of the motor 20 and the rotation shaft of the front wheels 16.

For example, the inverters 42, 46 are structured as a three-phase bridge type, and perform DC/AC conversion, that is, convert DC into three-phase AC. Then, the inverters 42, 46 supply the AC to coils of the motors 14, 20. Moreover, the inverters 42, 46 supply DC after AC/DC conversion resulting from regenerative operation of the motors 14, 20 to the side of the branch part 30. Switch elements provided to the inverters 42, 46 operate in accordance with a driving signal that is output from the control device 26.

The switches 40, 48 are contactors that switch electric connection/disconnection of the power paths 32, 36, and operate in accordance with an ON/OFF signal that is output from the control device 26. The current sensor 44 is provided to each phase of the rear-side power path 32 between the rear-side inverter 42 and the rear motor 14, and detects a current value of each phase and outputs the detected value to the control device 26.

The battery 22 supplies electric power to the motors 14, 20 and the auxiliary machine 24 through the inverters 42, 46 and charges regenerative electric power that is output from the motors 14, 20. The DC/DC converter 50 reduces output voltage of the battery 22 or output voltage of the motors 14, 20, and supplies the reduced voltage to the auxiliary machine 24.

The control device 26 is an ECU and issues instructions about the driving force control and charging/discharging control. The control device 26 functions as a driving force control unit 54, an abnormality determination unit 56, and a switch control unit 58 when a processor (not shown) such as a CPU reads out and executes programs stored in a memory (not shown). On the basis of detection values from various sensors that are not shown (for example, an accelerator pedal opening, a vehicle speed, and a current and a rotation speed of motors 14, 20), the driving force control unit 54 controls operation of the switch element (not shown) of the inverters 42, 46 and controls operation of the engine 18. The abnormality determination unit 56 determines whether abnormality has occurred in the rear-side inverter 42 or the rear motor 14 on the basis of detection values from the current sensors 44. The switch control unit 58 manages ON/OFF states of the switches 40, 48, and outputs ON/OFF signals to the switches 40, 48.

1.2. Operation of Vehicle 10

Figure 2:
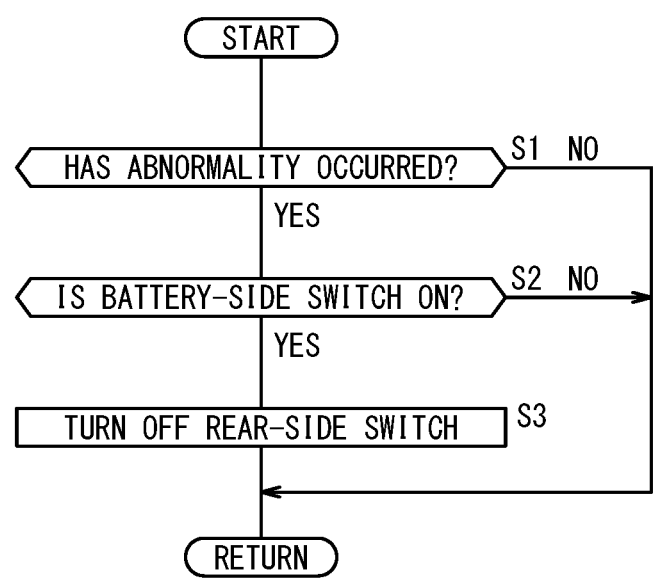
FIG. 2 is a flowchart that shows operation in the first embodiment.

Operation of the vehicle 10 illustrated in FIG. 1 is described with reference to FIG. 2. Note that the operation to be described below is performed when the battery-side switch 48 and the rear-side switch 40 are in the ON state and the rear motor 14 is used as a driving source or a power generator of the vehicle 10. The following operation is repeatedly performed at predetermined time intervals while the vehicle 10 is traveling.

In step S1, the abnormality determination unit 56 determines whether the abnormality has occurred in the rear-side inverter 42 or the rear motor 14 on the basis of the detection values from the current sensors 44. For example, if short-circuit failure has occurred in any phase of the rear-side inverter 42, the current value thereof detected by the current sensor 44 becomes excessive. As described above, if the abnormality has occurred in the rear-side inverter 42 or the rear motor 14, the current value detected by the current sensor 44 becomes an abnormal value (out of a predetermined range or zero). The abnormality determination unit 56 determines the occurrence of the abnormality if the abnormal value is obtained. If the abnormality has occurred (step S1: YES), the process advances to step S2. On the other hand, if the abnormality has not occurred (step S1: NO), the process is terminated and the next process is awaited.

If the process has advanced from step S1 to step S2, the switch control unit 58 determines the ON/OFF state of the battery-side switch 48. If the state is ON (step S2: YES), the process advances to step S3. On the other hand, if the state is OFF (step S2: NO), the process is terminated.

If the process has advanced from step S2 to step S3, the switch control unit 58 outputs the OFF signal to the rear-side switch 40 and changes the state from the ON state to the OFF state. The rear-side switch 40 is changed from the ON state to the OFF state in accordance with the OFF signal. Then, the power path 28 (32) between the battery 22 and the rear motor 14 is disconnected.

If a series of processes of step S1 to step S3 ends, the vehicle 10 continues traveling by using the engine 18 or the front motor 20 to which the battery 22 supplies electric power, as the driving source.

In the above embodiment, if the abnormality has occurred in the rear-side inverter 42 or the rear motor 14, the rear-side switch 40 is disconnected and the vehicle 10 continues traveling with the front motor 20. In this state, even if the abnormality has occurred in the front-side inverter 46 or the front motor 20, the battery-side switch 48 is disconnected. By this control, the battery 22 can be protected.

1.3. First Modification of First Embodiment

In the embodiment illustrated in FIG. 1, the rear-side switch 40 electrically disconnects the battery 22 and the rear-side inverter 42. Alternatively, as shown in a first modification illustrated in FIG. 3, the rear-side inverter 42 and the rear motor 14 may be electrically disconnected from each other.

Figure 8A:
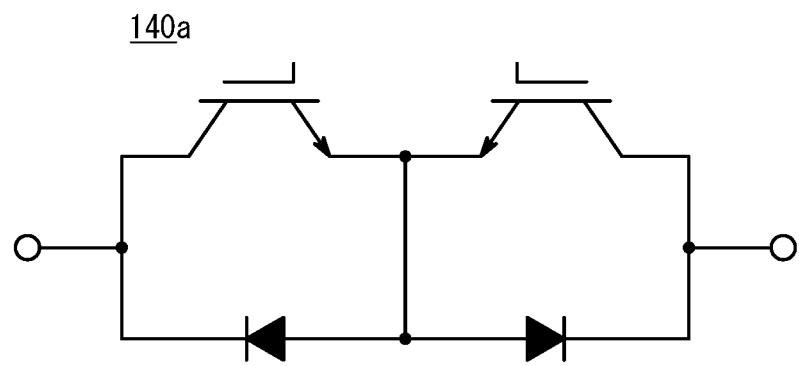
FIG. 8A and FIG. 8B illustrate specific examples of a switch element.
Figure 8B:
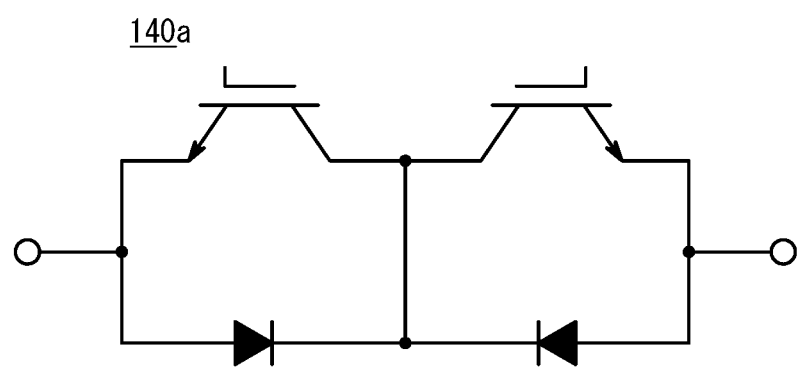

A gate switch 140 (hereinafter, also referred to as switch 140) is formed by a switch element 140a that is disposed in the power path of each phase between the rear-side inverter 42 and the rear motor 14. As the switch element 140a, an IGBT bidirectional switch formed by IGBTs and diodes as illustrated in FIG. 8A or 8B can be used, for example. Each switch element 140a provided to the switch 140 operates in accordance with the ON/OFF signal that is output from the control device 26.

Figure 3:
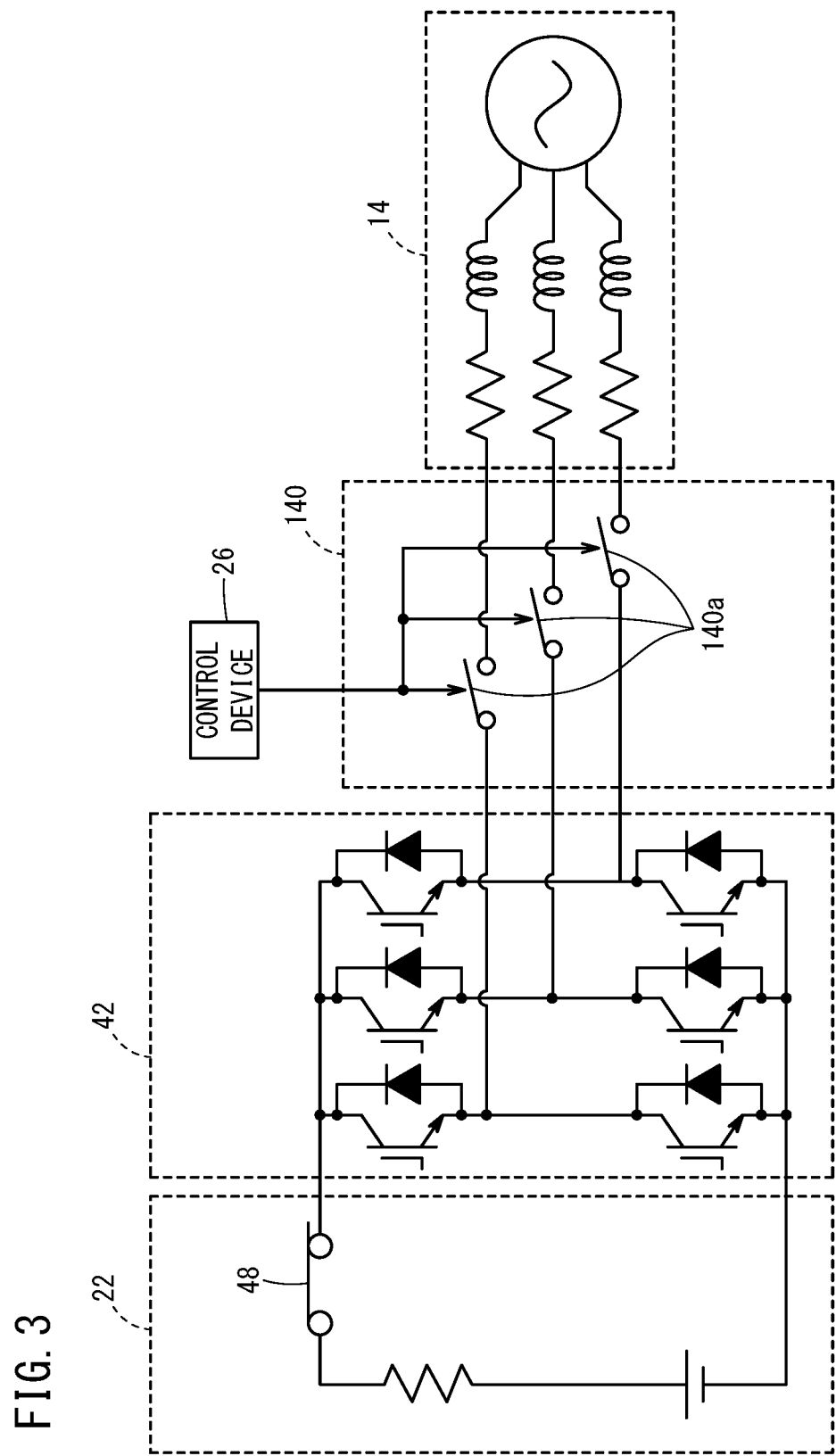
FIG. 3 is a circuit diagram that illustrates a first modification of the first embodiment.

An advantage of the first modification illustrated in FIG. 3 is hereinafter described. In the embodiment illustrated in FIG. 1, it is possible to prevent overcurrent from flowing into the battery 22 from the side of the rear motor 14. However, it is not possible to prevent the overcurrent from flowing into the rear-side inverter 42. If the overcurrent flows into the rear-side inverter 42, the failure may further occur in the rear-side inverter 42. One example of a technique to prevent the overcurrent from flowing into the inverter when the motor 14 operates as the power generator is disclosed in Japanese Patent No. 4757815.

In the technique disclosed in Japanese Patent No. 4757815, if the short-circuit failure has occurred in the switch element in any phase in the inverter, all the switch elements in a positive electrode or a negative electrode of the inverter where the short-circuit failure has occurred are changed to the ON state (short-circuited state). Thus, the overcurrent is suppressed. In this control, the short circuit occurs in the three phases. Thus, this control is referred to as three-phase short-circuit control.

In the three-phase short-circuit control, it is possible to reduce a peak value of the current that circulates between the inverter and the motor. Thus, the inverter and the battery can be protected. The peak value is reduced; however, the current continues circulating between the inverter and the motor, so that the motor operates as a regenerative brake. For example, if the torque of the motor is large, that is, if a counter electromotive voltage constant that may increase circulation current is large, the braking force by the regenerative brake becomes large. In addition, even if the three-phase short-circuit control is performed, the circulation current is still large, so that devices may generate heat and be broken. Thus, in order to protect the devices, the rotation speed of the motor needs to be reduced excessively, that is, the vehicle speed needs to be restricted excessively. Therefore, there is room for improvement in the runnability after the switch element or the like fails.

The gate switch 140 illustrated in FIG. 3 can disconnect the power path of each phase between the rear-side inverter 42 and the rear motor 14. Thus, even if the rear motor 14 continues rotating by external force, the current does not circulate between the rear-side inverter 42 and the rear motor 14. Therefore, the rear motor 14 does not operate as the regenerative brake. In addition, the devices do not generate heat due to the circulation current. Thus, it is not necessary to restrict the vehicle speed. Therefore, in the first modification illustrated in FIG. 3, the traveling can be continued without the restriction of the vehicle speed by the engine 18 or the front motor 20.

1.4. Second Modification of First Embodiment

A second modification of the embodiment illustrated in FIG. 1 is described with reference to FIG. 4. This second modification includes branch paths 70, 72 that branch from between the rear-side switch 40 and the rear-side inverter 42 in the rear-side power path 32. Piezoelectric elements 80, 82 (for example, piezo element) are disposed in the branch paths 70, 72, respectively.

The rear-side inverter 42 is provided with a bus bar 84 as a terminal of each phase. Similarly, the rear motor 14 is provided with a bus bar 86 as the terminal of each phase. In a conventional general structure, the bus bar 84 and the bus bar 86 are overlapped with each other, a bolt or the like (not shown) is inserted into both bus bars, and the bolt is tightened. Thus, the rear-side inverter 42 and the rear motor 14 are electrically connected with each other. In the present structure, the piezoelectric element 80 exists between the bus bar 84 and a grounding part 74 on a side of the bus bar 84, and the piezoelectric element 82 exists between the bus bar 86 and a grounding part 76 on a side of the bus bar 86.

The piezoelectric element 80 is displaced when the voltage is applied by the battery 22, and the piezoelectric element 80 presses the bus bar 84 toward the bus bar 86. Similarly, the piezoelectric element 82 is displaced when the voltage is applied by the battery 22, and the piezoelectric element 82 presses the bus bar 86 toward the bus bar 84.

Figure 4:
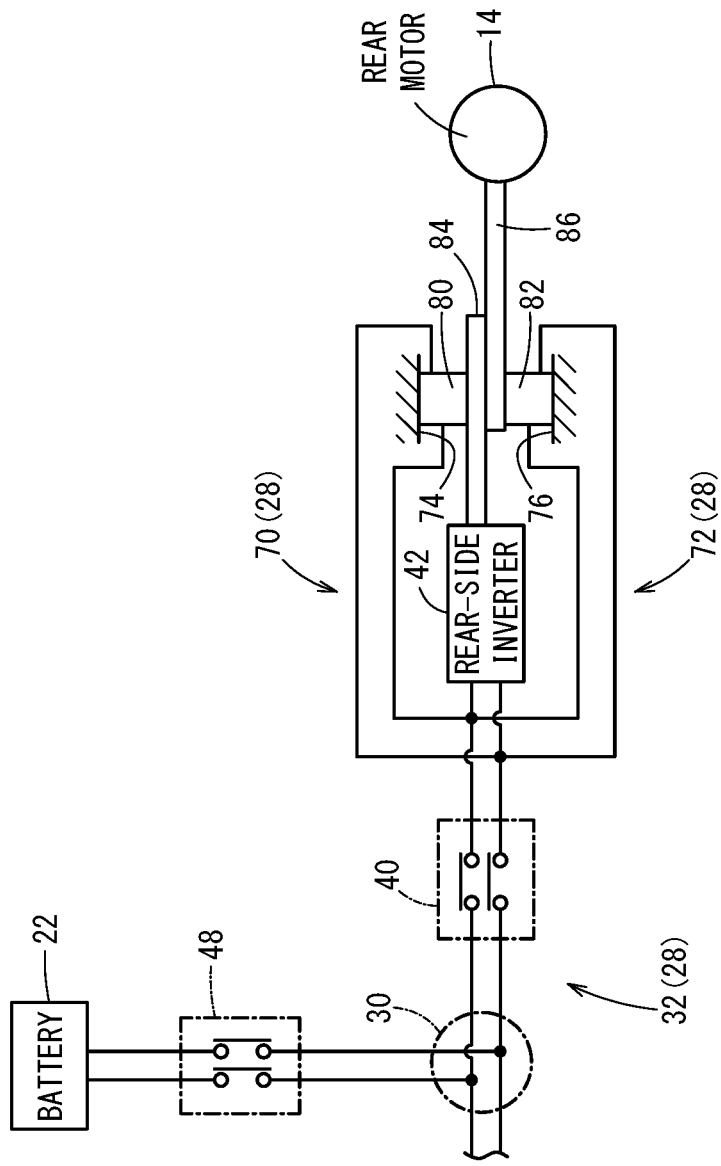
FIG. 4 is a circuit diagram that illustrates a second modification of the first embodiment.

Operation of the second modification illustrated in FIG. 4 is described. If the rear-side switch 40 is in the ON state, the piezoelectric elements 80, 82 press the bus bars 84, 86 so that the bus bars 84, 86 come close to each other in accordance with the voltage that is applied by the battery 22. In this case, a load that is generated between the bus bar 84 and the bus bar 86 becomes large. Thus, contact resistance becomes low. Similarly to the embodiment illustrated in FIG. 1, if the rear-side switch 40 is turned off, the voltage that is applied to the piezoelectric elements 80, 82 is stopped. In this case, the load that is generated between the bus bar 84 and the bus bar 86 becomes small. Thus, the contact resistance becomes high. In this state, if the overcurrent circulates between the rear-side inverter 42 and the rear motor 14, a part where the contact resistance is high generates heat and the part is melted and broken. As a result, the rear-side inverter 42 and the rear motor 14 are electrically disconnected from each other. Note that if the displacement amount of the piezoelectric element 80 can be large, the bus bar 84 and the bus bar 86 may be physically placed in a non-contact state.

In the second modification, by turning off the rear-side switch 40 that is disposed between the battery 22 and the rear-side inverter 42, the rear-side inverter 42 and the rear motor 14 can be electrically disconnected from each other. Therefore, the same effect as that in the first modification illustrated in FIG. 3 can be obtained.

2. Second Embodiment

Figure 5:
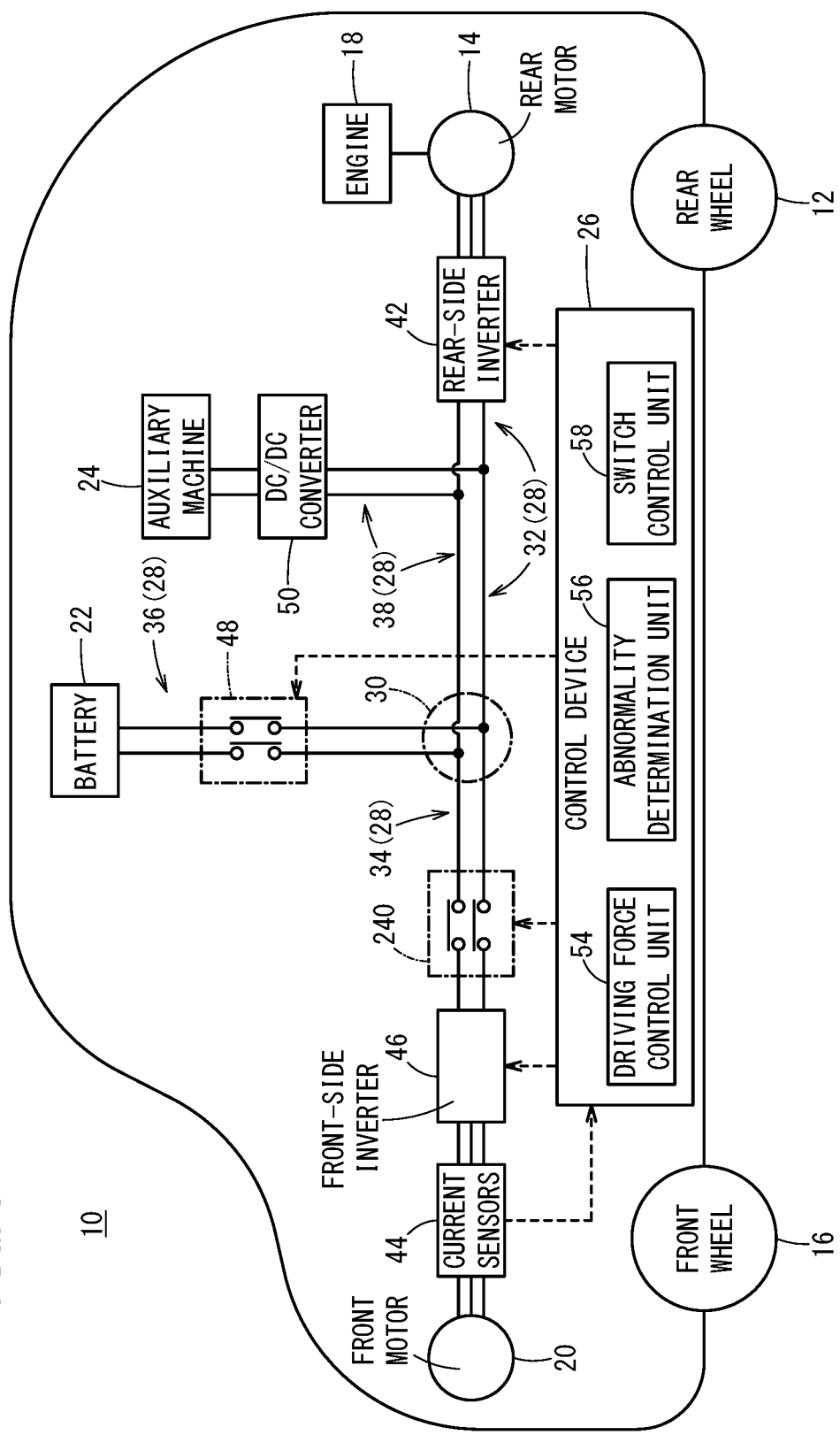
FIG. 5 is a circuit diagram that simply illustrates a circuit of a vehicle according to a second embodiment of the present invention.

The present invention can be applied to the vehicle 10 with various circuit configurations. For example, as illustrated in FIG. 5, the vehicle 10 according to a second embodiment is different from the vehicle 10 according to the first embodiment (FIG. 1) in the following points: the vehicle 10 according to the second embodiment includes a front-side switch 240 instead of the rear-side switch 40; the current sensors 44 detect the abnormality in the front-side inverter 46 or the front motor 20; and the output shaft of the engine 18 is connected to the output shaft of the motor 14 and the rotation shaft of the rear wheels 12 instead of the front wheels 16. In addition, in the second embodiment, the rear-side power path 32 and the auxiliary machine-side power path 38 have a common part partially.

The front-side switch 240 (hereinafter, also referred to as a switch 240) is a contactor that switches the electric connection/disconnection of the power path 34, and operates in accordance with the ON/OFF signal that is output from the control device 26. The front-side switch 240 is disposed between the branch part 30 and the front-side inverter 46. The current sensor 44 is provided to each phase of the front-side power path 34 between the front-side inverter 46 and the front motor 20, and detects the current value of each phase and outputs the detected value to the control device 26.

The operation of the vehicle 10 according to the second embodiment is substantially the same as the operation (FIG. 2) of the vehicle 10 according to the first embodiment. Thus, the detailed description of the operation in the second embodiment is omitted. In the vehicle 10 according to the second embodiment, the abnormality determination unit 56 determines whether the abnormality has occurred in the front-side inverter 46 or the front motor 20 on the basis of the detection results from the current sensors 44. If the abnormality has occurred, the switch control unit 58 outputs the OFF signal to the front-side switch 240. Then, the front-side switch 240 is turned off. In addition, the battery-side switch 48 is turned on. As a result, the battery 22 supplies electric power to the rear motor 14 through the power paths 36, 32, so that the vehicle 10 continues traveling.

The first modification (FIG. 3) and the second modification (FIG. 4) of the first embodiment can also be employed in the second embodiment. In a case where the first modification illustrated in FIG. 3 is employed in the second embodiment, the gate switch 140 is disposed between the front-side inverter 46 and the front motor 20. In addition, in a case where the second modification illustrated in FIG. 4 is employed in the second embodiment, the branch paths 70, 72 branch from between the front-side switch 240 and the front-side inverter 46. Moreover, the piezoelectric elements 80, 82 press a bus bar (not shown) corresponding to a terminal of the front-side inverter 46 and a bus bar (not shown) corresponding to a terminal of the front motor 20.

3. Third Embodiment

Figure 6:
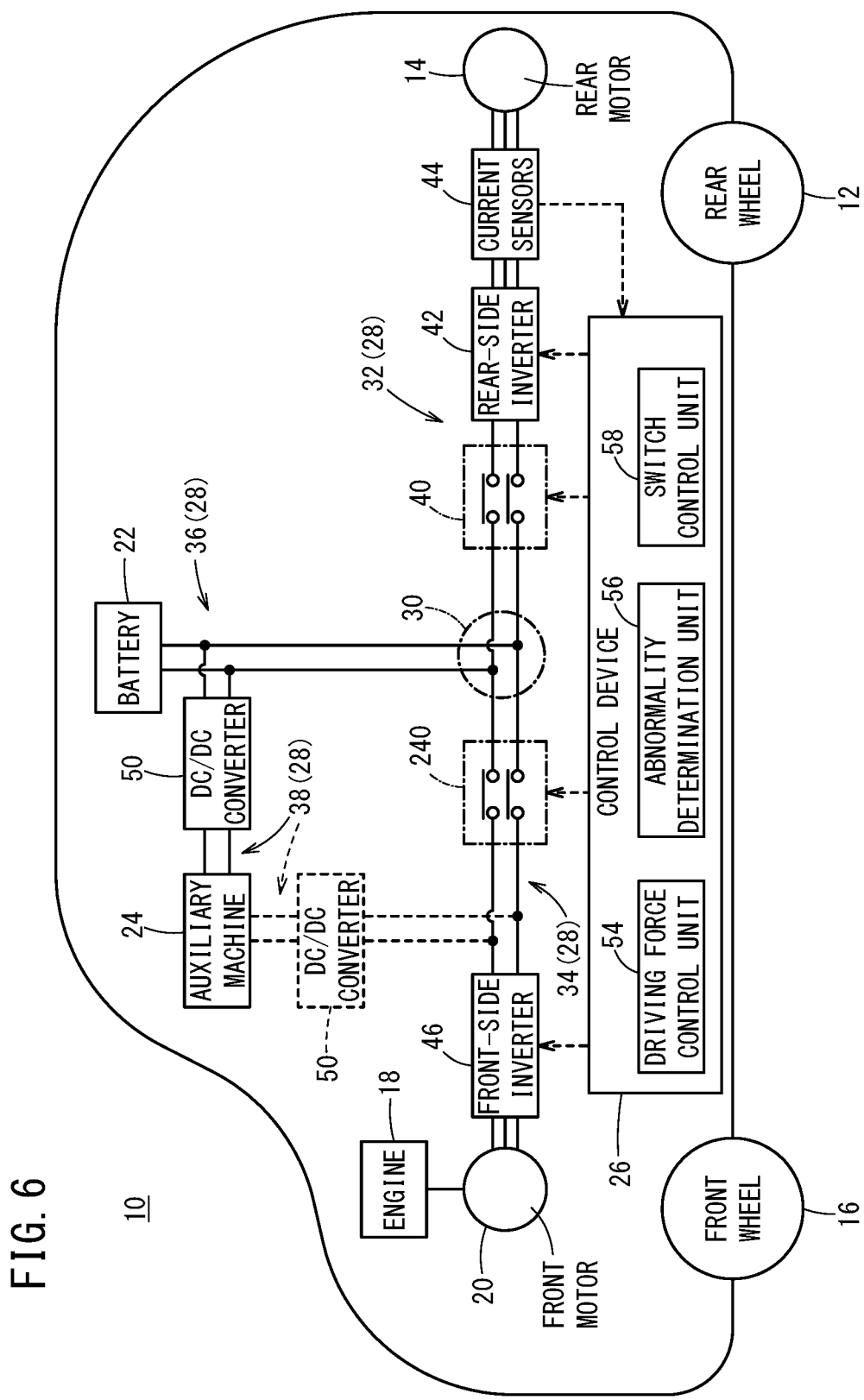
FIG. 6 is a circuit diagram that simply illustrates a circuit of a vehicle according to a third embodiment of the present invention.

As illustrated in FIG. 6, in the vehicle 10 according to a third embodiment, the position of the auxiliary machine-side power path 38 and the position of the switch are different from those in the vehicle 10 according to the first embodiment (FIG. 1). In the third embodiment, the front-side switch 240 is provided to the front-side power path 34, and the auxiliary machine-side power path 38 branches from the power path 28 among the front-side switch 240, the rear-side switch 40, and the battery 22.

Figure 9:
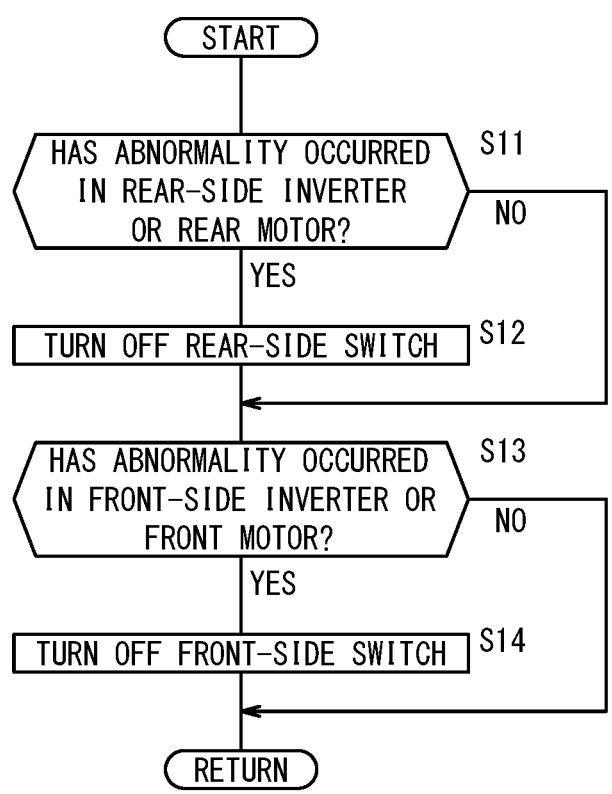
FIG. 9 is a flowchart that shows operation in the third embodiment and the fourth embodiment.

The operation of the vehicle 10 according to the third embodiment is described with reference to FIG. 9. The following operation is repeatedly performed at predetermined time intervals while the vehicle 10 is traveling.

In step S11, the abnormality determination unit 56 determines whether the abnormality has occurred in the rear-side inverter 42 or the rear motor 14 on the basis of the detection values from the current sensors 44. If the abnormality has occurred (step S11: YES), the process advances to step S12. On the other hand, if the abnormality has not occurred (step S11: NO), the process advances to step S13.

If the process has advanced from step S11 to step S12, the switch control unit 58 outputs the OFF signal to the rear-side switch 40 and changes the state from the ON state to the OFF state. The rear-side switch 40 is changed from the ON state to the OFF state in accordance with the OFF signal. Then, the power path 28 (32) between the battery 22 and the rear motor 14 is disconnected.

In step S13, the abnormality determination unit 56 determines whether the abnormality has occurred in the front-side inverter 46 or the front motor 20 on the basis of the detection values from the current sensors 44. If the abnormality has occurred (step S13: YES), the process advances to step S14. On the other hand, if the abnormality has not occurred (step S13: NO), the process is terminated and the next process is awaited.

If the process has advanced from step S13 to step S14, the switch control unit 58 outputs the OFF signal to the front-side switch 240 and changes the state from the ON state to the OFF state. The front-side switch 240 is changed from the ON state to the OFF state in accordance with the OFF signal. Then, the power path 28 (34) between the battery 22 and the front motor 20 is disconnected.

In the third embodiment, even if any one of the front-side switch 240 and the rear-side switch 40 is disconnected, the electrical connection between the auxiliary machine-side power path 38 and the battery 22 can be kept. Moreover, even if the front-side switch 240 is disconnected, the vehicle 10 continues traveling by the driving of the rear motor 14 in a case where the rear-side switch 40 is in the connected state. Furthermore, even if the rear-side switch 40 is disconnected, the vehicle 10 continues traveling by the driving of the front motor 20 in a case where the front-side switch 240 is in the connected state.

As a modification of the third embodiment, the auxiliary machine-side power path 38 may branch from the power path 34 between the front-side switch 240 and the front-side inverter 46 (broken line in FIG. 6). In this modification (broken line in FIG. 6), if the front-side switch 240 is disconnected, the power supply from the battery 22 to the auxiliary machine 24 is stopped. However, the electrical connection between the auxiliary machine 24 and the front motor 20 is kept. In a case where the front motor 20 is driven by the engine 18, electric power output from the front motor 20 is supplied to the auxiliary machine 24 through the DC/DC converter 50. Thus, the operation of the auxiliary machine 24 can be continued.

In addition, in the third embodiment, the switch can be disposed between each motor 14, 20 and each inverter 42, 46 as shown in the first modification (FIG. 3) and the second modification (FIG. 4) in the first embodiment.

4. Fourth Embodiment

Figure 7:
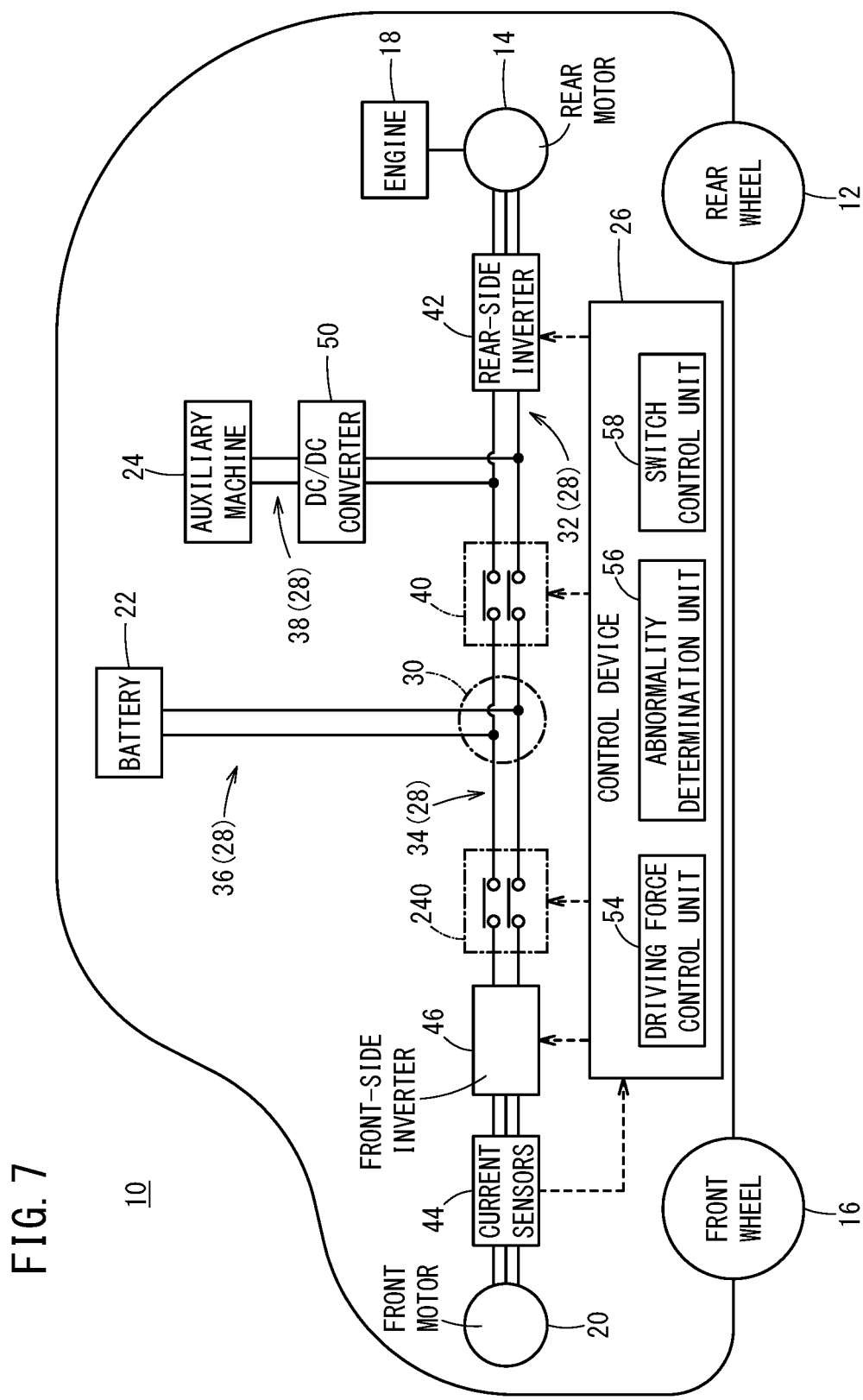
FIG. 7 is a circuit diagram that simply illustrates a circuit of a vehicle according to a fourth embodiment of the present invention.

As illustrated in FIG. 7, the vehicle 10 according to a fourth embodiment is different from the vehicle 10 according to the second embodiment (FIG. 5) in that the rear-side switch 40 is provided instead of the battery-side switch 48. In the fourth embodiment, the rear-side switch 40 is disposed between the branch part 30 and the DC/DC converter 50, and between the branch part 30 and the rear-side inverter 42.

The vehicle 10 according to the fourth embodiment is the same as the vehicle 10 according to the third embodiment in that the rear-side switch 40 and the front-side switch 240 are provided. The operation of the vehicle 10 according to the fourth embodiment is the same as the operation (FIG. 9) of the vehicle 10 according to the third embodiment. Thus, the description of the operation in the fourth embodiment is omitted.

The first modification (FIG. 3) and the second modification (FIG. 4) of the first embodiment can also be employed in the fourth embodiment. In a case where the first modification illustrated in FIG. 3 is employed in the fourth embodiment, the gate switch 140 is disposed between the front-side inverter 46 and the front motor 20. In addition, in a case where the second modification illustrated in FIG. 4 is employed in the fourth embodiment, the branch paths 70, 72 branch from between the front-side switch 240 and the front-side inverter 46. Moreover, the piezoelectric elements 80, 82 press a bus bar (not shown) corresponding to a terminal of the front-side inverter 46 and a bus bar (not shown) corresponding to a terminal of the front motor 20.

5. Summary of Embodiments

5.1. Summary of First and Third Embodiments

As illustrated in FIG. 1 or FIG. 6, the vehicle 10 includes: the motor 14 (rotary electric machine) for the vehicle driving; the battery 22 (cell) configured to supply electric power to the motor 14; the auxiliary machine 24 configured to operate with the lower voltage than the voltage of the battery 22; the power path 28 including the power path 32 (first power path) connected to the motor 14, the power path 38 (second power path) connected to the auxiliary machine 24, the power path 36 (third power path) connected to the battery 22, and the branch part 30 that branches to the side of the power path 32, the side of the power path 38, and the side of the power path 36; the switch 40 (first switch) disposed in the power path 32 between the branch part 30 and the motor 14; the switch 240 (second switch) disposed in the power path 38 between the branch part 30 and the auxiliary machine 24 as illustrated in FIG. 6 or the switch 48 (second switch) disposed in the power path 36 between the branch part 30 and the battery 22 as illustrated in FIG. 1; the control device 26 configured to control the operation of the switch 40 and the switch 48 (240); the inverter 42 (driving circuit) disposed in the power path 32 in order to drive the motor 14; the motor 20 or the engine 18 (driving source) other than the motor 14 configured to be used for the vehicle driving; and the current sensor 44 configured to detect the abnormality in the motor 14 or the inverter 42. If the current sensor 44 has detected the abnormality, the control device 26 controls in a manner that the switch 40 is turned off and the switch 48 (240) is turned on, and continues the traveling of the vehicle 10 by using the motor 20 or the engine 18.

In the above configuration, when the abnormality has occurred in the motor 14 or the inverter 42, the switch 40 is controlled so as to be turned off. Thus, it is possible to prevent the overcurrent from flowing into the battery 22 from the motor 14 due to the counter electromotive voltage generated when the motor 14 operates as the power generator. In addition, since the switches 48, 240 are controlled so as to be turned on at this time, electric power can be supplied from the battery 22 to the auxiliary machine 24. Thus, the operation of the auxiliary machine 24 can be continued.

The vehicle 10 includes the motor 20 (different rotary electric machine) that is different from the motor 14. The power path 28 includes the power path 34 (fourth power path) connected to the motor 20. The motor 20 is disposed in the power path 34 that branches from the branch part 30. If the abnormality has occurred in the motor 14 or the inverter 42, electric power is supplied from the battery 22 to the motor 20 through the power paths 36, 34 in a manner that the traveling is continued by the motor 20.

In the above configuration, in the case where the control is performed so that the switch 40 is turned off and the switches 48, 240 are turned on, even if failure occurs in the motor 20 or the inverter 46 that drives the motor 20, the battery 22 can be protected by controlling to turn off the switches 48, 240.

As illustrated in FIG. 3, the switch 140 that is provided instead of the switch 40 is disposed in the power path 32 between the motor 14 and the inverter 42.

In the above configuration, the motor 14 and the inverter 42 can be electrically disconnected from each other by turning off the switch 140. Thus, in the case where the vehicle 10 continues traveling in the occurrence of the short-circuit failure in the motor 14 or the inverter 42, the restriction on the rotation speed of the motor 14 or the driving can be suppressed.

Note that the first and third embodiments also have the following aspect. That is, the vehicle 10 includes: the motors 14, 20 (first rotary electric machine and second rotary electric machine) for the vehicle driving; the battery 22 (cell) configured to supply electric power to the motors 14, 20; the power path 28 including the power path 32 (first power path) connected to the motor 14, the power path 34 (second power path) connected to the motor 20, the power path 36 (third power path) connected to the battery 22, and the branch part 30 that branches to the side of the power path 32, the side of the power path 34, and the side of the power path 36; the switch 40 (first switch) disposed in the power path 32 between the branch part 30 and the motor 14; the switch 240 (second switch) disposed in the power path 34 between the branch part 30 and the motor 20 as illustrated in FIG. 5 or the switch 48 (second switch) disposed in the power path 36 between the branch part 30 and the battery 22; the control device 26 configured to control the operation of the switch 40 and the switch 48 (240); the inverter 42 (driving circuit) disposed in the power path 32 in order to drive the motor 14; and the current sensor 44 configured to detect the abnormality in the motor 14 or the inverter 42. If the current sensor 44 has detected the abnormality, the control device 26 controls in a manner that the switch 40 is turned off and the switch 48 (240) is turned on.

In the above configuration, when the abnormality has occurred in the motor 14 or the inverter 42, the switch 40 is controlled so as to be turned off. Thus, it is possible to prevent the overcurrent from flowing into the battery 22 from the motor 14 due to the counter electromotive voltage generated when the motor 14 operates as the power generator. In addition, since the switches 48, 240 are controlled so as to be turned on at this time, electric power can be supplied from the battery 22 to the motor 20. Thus, the traveling can be continued by using the motor 20 as the driving source.

Moreover, as shown by the broken line in FIG. 6, the vehicle 10 includes: the engine 18 (internal combustion engine) connected to the motor 20 in a manner that motive power is configured to be transmitted between the engine 18 and the motor 20; and the auxiliary machine 24 connected to the battery 22 and the motor 20 through the power path 38 that branches from the power path 34 between the switch 240 and the motor 20, configured to operate with the lower voltage than the voltage of the battery 22, and configured to operate with electric power supplied from the battery 22 or electric power supplied from the motor 20 that generates electric power by the motive power from the engine 18.

In the above configuration, even after the switches 40, 140 are controlled so as to be turned off, electric power can be supplied from the motor 20 driven by the engine 18 to the auxiliary machine 24. Thus, the operation of the auxiliary machine 24 can be continued.

As illustrated in FIG. 4, the vehicle 10 includes the piezoelectric elements 80, 82 disposed in the branch paths 70, 72 that branch from between the switch 40 and the inverter 42 and configured to generate pressure by being supplied with electric power. As the pressing force becomes larger, the contact resistance between the terminal of the inverter 42 and the terminal of the motor 14 becomes lower, and as the pressing force becomes smaller, the contact resistance becomes higher. When the switch 40 is ON, the voltage is applied from the battery 22 to the piezoelectric elements 80, 82. In this state, the pressing force between the terminal of the inverter 42 and the terminal of the motor 14 becomes large by the piezoelectric elements 80, 82. When the switch 40 is OFF, the voltage applied from the battery 22 to the piezoelectric elements 80, 82 is stopped. In this state, the pressing force between the terminal of the inverter 42 and the terminal of the motor 14 becomes small by the piezoelectric elements 80, 82.

In the above configuration, by turning off the switch 40, the contact resistance between the terminal of the inverter 42 and the terminal of the motor 14 can be high. If the abnormality occurs in the inverter 42 or the motor 14, the overcurrent circulates between the inverter 42 and the motor 14. At this time, a part where the contact resistance is high generates heat and the part is melted and broken. As a result, the inverter 42 and the motor 14 are electrically disconnected from each other. Thus, it is possible to prevent the motor 14 from operating as the brake.

5.2. Summary of Second and Fourth Embodiments

In the second and fourth embodiments, the components on the side of the front wheels 16 and the components on the side of the rear wheels 12 are switched using the branch part 30 in the first and the third embodiments as the border. Thus, in the second and fourth embodiments, the advantageous effects that are the same as that in the first and third embodiments can be obtained.

Note that the vehicle according to the present invention is not limited to the aforementioned embodiments and can employ various configurations without departing from the gist of the present invention.

REFERENCE SIGNS LIST 10 vehicle
14 rear motor, motor (rotary electric machine)
18 engine (internal combustion engine)
20 front motor, motor (rotary electric machine)
22 battery (cell)
24 auxiliary machine
26 control device
28 power path
30 branch part
32 rear-side power path, power path
34 front-side power path, power path
36 battery-side power path, power path
38 auxiliary machine-side power path, power path
40 rear-side switch, switch
42 rear-side inverter, inverter (driving circuit)
44 current sensor (sensor)
46 front-side inverter, inverter (driving circuit)
48 battery-side switch, switch
70, 72 branch path
80, 82 piezoelectric element
140 gate switch, switch

The invention claimed is:

1. A vehicle comprising:
a rotary electric machine for vehicle driving;
a battery configured to supply electric power to the rotary electric machine;
an auxiliary machine configured to operate with lower voltage than voltage of the battery;
a power path including a first power path connected to the rotary electric machine, a second power path connected to the auxiliary machine, a third power path connected to the battery, and a branch part that branches to a side of the first power path, a side of the second power path, and a side of the third power path;
a first switch disposed in the first power path between the branch part and the rotary electric machine;
a second switch disposed in the second power path between the branch part and the auxiliary machine or disposed in the third power path between the branch part and the battery;
a control device configured to control operation of the first switch and the second switch;
a driving circuit disposed in the first power path in order to drive the rotary electric machine;
a driving source other than the rotary electric machine, the driving source configured to be used for the vehicle driving; and
a sensor configured to detect abnormality in the rotary electric machine or the driving circuit,
wherein if the sensor has detected the abnormality, the control device controls in a manner that the first switch is turned off and the second switch is turned on, and continues traveling of the vehicle by using the driving source.

2. The vehicle according to claim 1, wherein:
the driving source includes another rotary electric machine that is different from the rotary electric machine;
the power path includes a fourth power path connected to the other rotary electric machine;
the other rotary electric machine is disposed in the fourth power path that branches from the branch part; and
if the abnormality has occurred in the rotary electric machine or the driving circuit, electric power is supplied from the battery to the other rotary electric machine through the second power path and the fourth power path in a manner that the traveling is continued by the other rotary electric machine.

3. The vehicle according to claim 1, wherein the first switch is disposed in the power path between the rotary electric machine and the driving circuit.

4. A vehicle comprising:
a first rotary electric machine and a second rotary electric machine for vehicle driving;
a battery configured to supply electric power to the first rotary electric machine and the second rotary electric machine;
a power path including a first power path connected to the first rotary electric machine, a second power path connected to the second rotary electric machine, a third power path connected to the battery, and a branch part that branches to a side of the first power path, a side of the second power path, and a side of the third power path;
a first switch disposed in the first power path between the branch part and the first rotary electric machine;
a second switch disposed in the second power path between the branch part and the second rotary electric machine or disposed in the third power path between the branch part and the battery;
a control device configured to control operation of the first switch and the second switch;
a driving circuit disposed in the first power path in order to drive the first rotary electric machine; and
a sensor configured to detect abnormality in the first rotary electric machine or the driving circuit,
wherein if the sensor has detected the abnormality, the control device controls in a manner that the first switch is turned off and the second switch is turned on.

5. The vehicle according to claim 4, wherein the second switch is disposed in the second power path.

6. A vehicle comprising:
a first rotary electric machine and a second rotary electric machine for vehicle driving;
a battery configured to supply electric power to the first rotary electric machine and the second rotary electric machine;
a power path including a first power path connected to the first rotary electric machine, a second power path connected to the second rotary electric machine, a third power path connected to the battery, and a branch part that branches to a side of the first power path, a side of the second power path, and a side of the third power path;
a first switch disposed in the first power path between the branch part and the first rotary electric machine or disposed in the third power path between the branch part and the battery;
a second switch disposed in the second power path between the branch part and the second rotary electric machine;
a control device configured to control operation of the first switch and the second switch;
a driving circuit disposed in the second power path in order to drive the second rotary electric machine; and
a sensor configured to detect abnormality in the second rotary electric machine or the driving circuit, wherein if the sensor has detected the abnormality, the control device controls in a manner that the second switch is turned off and the first switch is turned on.

7. The vehicle according to claim 6, wherein the first switch is disposed in the first power path.

8. The vehicle according to claim 4, further comprising an auxiliary machine connected to the battery through branch paths that branch from the power path between the battery and the first switch, the auxiliary machine being configured to operate with lower voltage than voltage of the battery.

9. The vehicle according to claim 6 or 7, further comprising an auxiliary machine connected to the battery through branch paths that branch from the power path between the battery and the second switch, the auxiliary machine being configured to operate with lower voltage than voltage of the battery.

10. The vehicle according to claim 4, further comprising:
an internal combustion engine connected to the first rotary electric machine in a manner that motive power is configured to be transmitted between the internal combustion engine and the first rotary electric machine; and
an auxiliary machine connected to the battery and the first rotary electric machine through the power path that branches from the power path between the first switch and the first rotary electric machine, the auxiliary machine being configured to operate with lower voltage than voltage of the battery, and configured to operate with electric power supplied from the battery or electric power supplied from the first rotary electric machine that generates electric power by the motive power from the internal combustion engine.

11. The vehicle according to claim 6, further comprising:
an internal combustion engine connected to the second rotary electric machine in a manner that motive power is configured to be transmitted between the internal combustion engine and the second rotary electric machine; and
an auxiliary machine connected to the battery and the second rotary electric machine through the power path that branches from the power path between the second switch and the second rotary electric machine, the auxiliary machine being configured to operate with lower voltage than voltage of the battery, and configured to operate with electric power supplied from the battery or electric power supplied from the second rotary electric machine that generates electric power by the motive power from the internal combustion engine.

12. The vehicle according to claim 1, further comprising piezoelectric elements disposed in branch paths that branch from between the first switch and the driving circuit, and configured to generate pressure by being supplied with electric power, wherein:
as pressing force becomes larger, contact resistance between a terminal of the driving circuit and a terminal of the rotary electric machine becomes lower, and as the pressing force becomes smaller, the contact resistance becomes higher; and
when the first switch is ON, the voltage is applied from the battery to the piezoelectric elements in a manner that the pressing force between the terminal of the driving circuit and the terminal of the rotary electric machine becomes large, and when the first switch is OFF, the voltage applied from the battery to the piezoelectric elements is stopped and the pressing force between the terminal of the driving circuit and the terminal of the rotary electric machine becomes small.

* * * * *